United States Patent [19]

Lai et al.

[11] Patent Number: 5,157,777

[45] Date of Patent: Oct. 20, 1992

[54] SYNCHRONOUS COMMUNICATION BETWEEN EXECUTION ENVIRONMENTS IN A DATA PROCESSING SYSTEM EMPLOYING AN OBJECT-ORIENTED MEMORY PROTECTION MECHANISM

[75] Inventors: Konrad K. Lai, Aloha; Frederick J. Pollack, Portland, both of Oreg.

[73] Assignee: Intel Corporation, Santa Clara, Calif.

[21] Appl. No.: 729,869

[22] Filed: Jul. 11, 1991

Related U.S. Application Data

[63] Continuation of Ser. No. 455,626, Dec. 22, 1989, abandoned.

[51] Int. Cl.⁵ .............................................. G06F 12/00
[52] U.S. Cl. .................................... 395/425; 364/969; 364/969.4; 364/DIG. 2
[58] Field of Search ............... 364/200, 900; 395/425

[56] References Cited

U.S. PATENT DOCUMENTS

| | | | |
|---|---|---|---|
| 4,442,484 | 4/1984 | Childs, Jr. et al. | 364/200 |
| 4,493,027 | 1/1985 | Katz et al. | 364/200 |
| 4,498,131 | 2/1985 | Bratt et al. | 364/200 |
| 4,498,132 | 2/1985 | Ahlstrom et al. | 364/200 |
| 4,791,550 | 12/1988 | Stevenson et al. | 364/200 |
| 4,811,208 | 3/1989 | Myers et al. | 364/200 |

*Primary Examiner*—Michael R. Fleming
*Assistant Examiner*—Glenn A. Auve
*Attorney, Agent, or Firm*—Owen L. Lamb

[57] ABSTRACT

A subsystem call mechanism for communicating between a first execution environment associated with a first domain object, and a second execution environment associated with a second domain object. An environment table object is associated with a process object. The environment table object includes a control stack which is an array of control stack entries which entries save the state of the first calling execution environment to be restored on a return from the second execution environment. A subsystem entry in the subsystem table specifies the object that defines region 2 of the target execution environment and the frame pointer of the topmost stack frame in the target environment, a supervisor Stack Pointer that is a linear address for the supervisor stack used when involving a supervisor call in the user mode (instead of the stack pointer in the current frame) to locate the new frame. The first domain object further includes Procedure Entries that specify the type and address of the target procedure. Each of the procedure entries includes a Procedure Entry Type field that indicates the type of procedure to be invoked, either a supervisor procedure or a subsystem procedure, and an offset into the target execution environment. The offset specifies the first instruction of the target procedure.

5 Claims, 7 Drawing Sheets

SYNCHRONOUS COMMUNICATION BETWEEN EXECUTION ENVIRONMENTS IN A DATA PROCESSING SYSTEM EMPLOYING AN OBJECT-ORIENTED MEMORY PROTECTION MECHANISM

This is a continuation of application Ser. No. 455,626 filed Dec. 22, 1989, abandoned.

CROSS REFERENCE TO RELATED APPLICATIONS

Ser. No. 07/455,625 filed Dec. 22, 1989, now U.S. Pat. No. 5,075,842, granted Dec. 24, 1991, which is incorporated herein by reference entitled "Method and Apparatus for Disabling Tag Bit Recognition and Allowing Privileged Operations to Occur in an Object-Oriented Memory Protection Mechanism", assigned to Intel Corporation, the assignee of the present invention.

Ser. No. 07/455,635 filed Dec. 22, 1989, now U.S. Pat. No. 5,075,845, granted Dec. 24, 1991, which is incorporated herein by reference entitled "Type Management and Control in an Object-Oriented Memory Protection Mechanism", assigned to Intel Corporation, the assignee of the present invention.

Ser. No. 07/455,585 filed Dec. 22, 1989, now U.S. Pat. No. 5,075,848, granted Dec. 24, 1991, which is incorporated herein by reference entitled "Object Lifetime Control in an Object-Oriented Memory Protection Mechanism", assigned to Intel Corporation, the assignee of the present invention.

BACKGROUND OF THE INVENTION

1. Field of the Invention

The invention relates to data processing systems, and more particularly to a subsystem call mechanism for use in a memory-accessing system which protects memory locations from unauthorized access.

2. Description of the Related Art

Modern computer systems are organized such that all information within the system is represented by hardware-recognized, memory-resident information structures called objects. This is known as an object-oriented computer architecture. An object is a package of data that is a representation of related information maintained in a logically-contiguous addressed set of memory locations.

In an object-oriented programming system, each type or class of object has a set of operations that are permitted to be performed on the objects that are members of the class. This is known as an object-based access mechanism. The internal structure of objects is hidden from the programmer. The programmer can manipulate the objects only with the permitted operations. Access to an object is by means of a pointer to the object called an access descriptor. An access descriptor describes the kind of representation (rep) rights (such as read rights or write rights) which define the various kinds of access to the object that are permitted by the holder of the access descriptor for that object.

In the system described in the above-reference U.S. Pat. No. 5,075,842 programming complexity is reduced in an object-oriented computer system by tagging words stored in memory so that the protection mechanism can distinguish between ordinary data and protected access descriptors. This type of protection is called a capability-based protection mechanism as distinguished from the older state-based protection mechanism. A state-based protection mechanism relies on a supervisor program state and a user state with privileged instructions performable only in the supervisor state. In order to provide for compatibility with the older untagged operating system and the new tagged operating system, it is desirable to be able to map supervisor calls of an untagged operating system to a tagged operating system.

It is therefore an object of the present invention to provide a call/return mechanism that can function with both a capability-based protection mechanism and a state-based protection mechanism.

SUMMARY OF THE INVENTION

Briefly, the above objects are accomplished in accordance with the invention by providing a first processor object and a first process object defining a first execution environment associated with a first domain object, and a second execution environment associated with a second domain object. A first environment table object is associated with the first process. The first environment table object includes a control stack for containing subsystem linkage information, the control stack being an array of control stack entries which entries save the state of the first calling execution environment to be restored on a return from the second execution environment.

The first domain object includes a Region 0 access descriptor that references an object which defines region 0 of the second (target) execution environment which is the target of a subsystem call, a Region 1 AD that references the object which defines region 1 of the second (target) execution environment which is the target of a subsystem call, and a subsystem ID that points to an entry in a subsystem table in the first environment table associated within the first process object. A subsystem entry in the subsystem table specifies the object that defines region 2 of the target execution environment, the frame pointer and the stack pointer of the topmost stack frame in the target environment. A supervisor Stack Pointer is provided that is a linear address (in words) for the supervisor stack used when invoking a supervisor call in the user mode (instead of the stack pointer in the current frame) to locate the new frame.

The first domain object further includes Procedure Entries that specify the type and address of the target procedure. Each of the procedure entries includes a Procedure Entry Type field that indicates the type of procedure to be invoked including, but not limited to, a supervisor procedure and a subsystem procedure, and an Offset into the target execution environment. The offset specifies the first instruction of the target procedure.

In accordance with an aspect of the invention, the Environment Table Object contains two data structures, a subsystem table and a control stack. The subsystem table locates all the region 2 stack objects and their corresponding topmost frame and stack pointers associated with a process.

In accordance with a further aspect of the invention, a Current Subsystem ID is saved in the second process object together with the current subsystem table offset for the current subsystem entry in the subsystem table associated with the first process and the linear address of the topmost frame and stack pointer is saved in the subsystem entry upon the condition that a subsystem is exited on a call to another subsystem.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein.

DESCRIPTION OF THE PREFERRED EMBODIMENT

Figure 1:
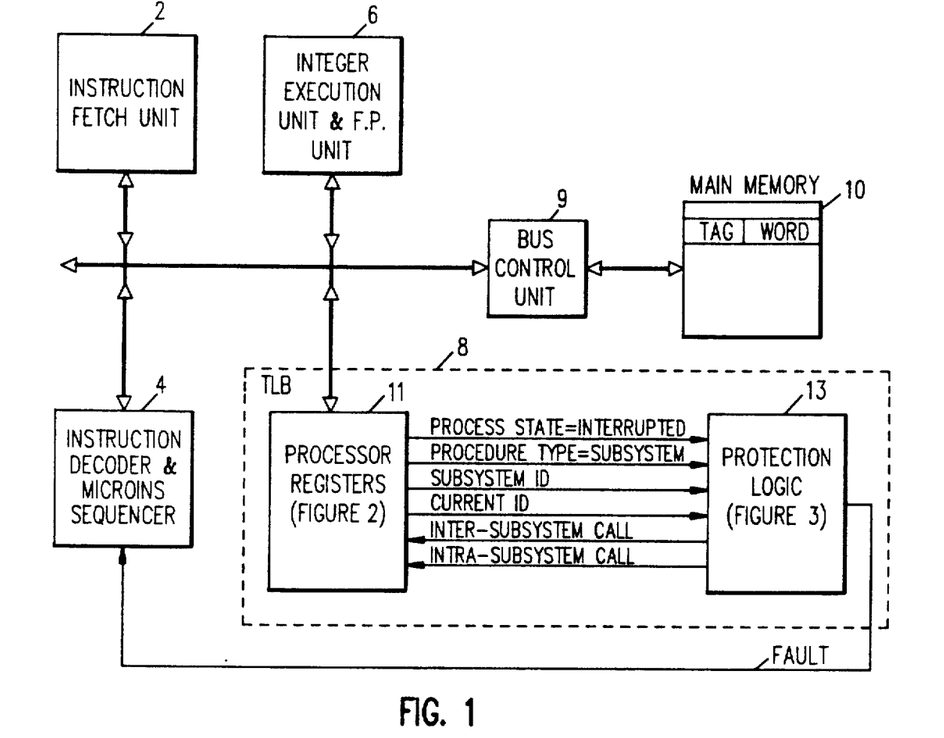
FIG. 1 is a functional block diagram of each of the major components of the microprocessor in which the invention is embodied.

Referring now to FIG. 1, the microprocessor is logically subdivided into five major units; the Instruction Fetch Unit (2), the Instruction Decoder and Microinstruction Sequencer (4), the Translation Lookaside Buffer (8), the Bus Control Unit (9), and the Integer Execution Unit and Floating Point Unit (6).

Communication paths between all of these units include a data bus, a microinstruction bus, and control signals, including a microinstruction-valid signal. The microinstruction bus controls and synchronizes the activities of the autonomous units. Each of the units is described briefly below and more fully in the above referenced U.S. Pat. No. 5,075,842, which is incorporated herein by reference.

The Instruction Fetch Unit (IFU) fetches, prefetches, and caches instructions from the main memory for use by the Instruction Decoder (ID).

The Instruction Decoder (ID) decodes and controls instruction (macrocode) execution. It decodes instructions, performs operand addressing and fetching, handles branch instructions (i.e., instruction pointer manipulation), and either emits execution microinstructions or starts microprogram flows.

The Microinstruction Sequencer (MIS) sequences microcode flows to handle initialization, macroinstructions that are too complex to handle directly, and exception and interrupt conditions. The MIS contains a microcode ROM and sequencing logic for microcode flows. The functions that the MIS performs include: fetch the next microinstruction, microprogram branching, handle exception conditions, and in conjunction with the ID, detect macroinstruction-boundary and trace events.

The Integer Execution Unit (IEU) executes most of the microinstructions issued by the ID and the MIS. It contains the registers visible to the programmer, scratch registers used by microcode, an ALU, and the logic needed to execute its instructions. The Floating Point Unit (FPU) contains the logic needed to perform floating point operations, and integer multiply and divide.

The Translation Lookaside Buffer (TLB) performs the address translation needed to implement virtual memory mechanisms. The address translation and memory protection uses an associative table of storage descriptors and page table entries. The TLB contains an address cache, an address adder, and memory protection checking hardware.

Finally, the Bus Control Logic (BCL) pipelines and sequences external bus accesses. The BCL contains the interface hardware to the external local bus, manages the bus protocol, and recognizes external events (e.g., interrupts, initialization).

Object-oriented Architecture

In an object-oriented programming system, each type or class of object has a set of operations that are permitted to be performed on the objects that are members of the class. This is called an object-based access mechanism. The internal structure of the object is hidden from the programmer. The programmer can manipulate the objects only with the permitted operations. Access to an object is by means of an access descriptor that is a pointer to the object. An access descriptor describes the kind of rights (such as read rights or write rights) which define the various kinds of access to the object that are permitted by the holder of the access descriptor for that object.

When describing a process, an operator is that which indicates the action to be taken on operands. An operand is usually identified by an address part of an instruction. Every instruction specifies an operator and several references. The operator specifies to the processor what hardware operation is to be performed, and the references select the operands to be used or manipulated. The operator specified in an instruction is encoded in two fields, the class field and the OP-code field. The class field specifies the operator class to which the operator belongs, and the OP-code field selects the hardware operation to be performed from within that class.

Execution Environment

A process sees a flat linear address space out of which it allocates data, instruction, and stack space. A call instruction creates a new stack frame (activation record) on a sequentially allocated stack. More information on the stack frames can be found in U.S. Pat. No. 4,811,208 entitled "Stack Frame Cache on a Microprocessor Chip" of Myers, et al.

An execution environment consists of the following objects: a linear address space, a set of global and floating-point registers, an instruction pointer, and an arithmetic control register.

The global registers are unaffected when crossing procedure boundaries. One of the registers contains the current frame pointer (FP) and the remainder are general-purpose registers. The FP contains the linear address (pointer) into the current execution environment for the current (topmost) stack frame. The global registers associated with a process are saved in the process control block when the process is not executing.

The floating-point registers associated with a process are saved in the process control block when the process is not executing.

An execution environment corresponds to a process-wide address space in other systems. The system supports multiple execution environments per process, but only one execution environment can be active at a time for each process.

The Arithmetic Controls are used to control the arithmetic and faulting properties of the numeric instructions as well as for storing the condition codes. When a process is suspended, the arithmetic controls information is saved in the process control block. When a call operation is performed to a new frame, the return IP is saved in the stack frame in the current linear address space.

Instruction Pointer

The Instruction Pointer (IP) is a linear address (pointer) into the current linear address space to the first byte of the current instruction.

The register model consists of the 16 global registers and 4 floating point registers that are preserved across procedure boundaries, and multiple sets of 16 local (or frame) registers. The register model is described in more detail in U.S. Pat. No. 4,891,753, of Budde, et al. entitled "Register Scoreboarding on a Microprocessor Chip", granted on Jan. 2, 1990.

At any instant, an instruction can address 36 of the registers as follows.

| Register Type | Register Name |
| --- | --- |
| Global Register | G0 ... G15 |
| Floating Point Register (floating point operand) | PP0 ... PP3 |
| Local Register | L0 ... L15 |

Global Registers

There are 16 global registers associated with a process; they are saved in the process control block when the process is not executing.

Of the 16 32-bit registers, G15 contains the current frame pointer (FP) and G0 ... G14 are general-purpose registers. The FP contains the linear address of the current (topmost) stack frame. Since stack frames are aligned to SALIGN*16 byte boundaries (SALIGN is an value depending upon a particular implementation), the low-order N bits of FP are ignored and always interpreted to be zero (N is given by SALIGN*16=2**N). This register is initialized on calls and restored on returns.

A reference to a register as an operand that is bigger than 32 bits uses the registers with consecutive higher register numbers.

Floating Point Registers

There are 4 floating point registers associated with a process; they are saved in the process control block when the process is not executing.

Floating point registers are accessed only as operands of floating point instructions.

Local (or Frame) Registers

Registers L0 ... L15, the local registers, do not denote registers of the conventional variety; they are allocated upon procedure calls and deallocated upon returns.

Multiple banks of local registers are provided, one bank per procedure activation, where the program does not have to save and restore registers explicitly.

When these registers need to be saved in memory, they are saved in the first 16 words of the stack frame of the associated procedure. They represent first 16 words of the stack frame, where register L0 is mapped into linear address FP+0 to FP+3, register Li is mapped into linear address FP+4i to FP+4i+3, and so on.

Since instructions must begin on word (4-byte) boundaries, the two low-order bits of IP are always 0.

Arithmetic Controls

The Arithmetic Controls (AC) are used to control the arithmetic and faulting properties of the numeric instructions as well as for storing the condition codes. When a process is suspended, the arithmetic controls are saved in the process control block.

Arithmetic Controls (AC) contain the following information:

Condition Code (bits 0-2). A set of flags set by comparison (and other) instructions and examined by conditional-branch (and other) instructions.

Arithmetic Status (bits 3-6). This field is altered as an indicator by certain floating-point instructions.

Integer Overflow Flag (bit 8). Sticky flag set whenever an integer overflow occurs and the mask is set. The flag is never implicitly cleared.

Integer Overflow Mask (bit 12). If set, an integer overflow does not generate an ARITHMETIC fault. If S is the destination size, the S least-significant bits of the result are stored in the destination unless otherwise noted.

No imprecise faults (bit 15). If NIF is set, faults are required to be precise. If NIF is clear, certain faults can be imprecise.

Floating-point Overflow Flag (bit 16). Sticky flag set whenever a floating-point overflow occurs and the mask is set. The flag is never implicitly cleared.

Floating-point Underflow Flag (bit 17). Sticky flag set whenever a floating-point underflow occurs and the mask is set. The flag is never implicitly cleared.

Floating-point Invalid-op Flag (bit 18). Sticky flag set whenever a floating-point invalid operation occurs and the mask is set. The flag is never implicitly cleared.

Floating-point Zero-divide Flag (bit 19). Sticky flag set whenever a floating-point division by zero occurs and the mask is set. The flag is never implicitly cleared.

Floating-point Inexact Flag (bit 20). Sticky flag set whenever a floating-point inexact result occurs and the mask is set. The flag is never implicitly cleared.

Floating-point Overflow Mask (bit 24). If set, a floating-point overflow does not generate a REAL_ARITHMETIC fault.

Floating-point Underflow Mask (bit 25). If set, a floating-point underflow does not generate a REAL_ARITHMETIC fault.

Floating-point Invalid-op Mask (bit 26). If set, a floating-point invalid operation does not generate a REAL_ARITHMETIC fault.

Floating-point Zero-divide Mask (bit 27). If set, a floating-point division by zero does not generate a REAL_ARITHMETIC fault.

Floating-point Inexact Mask (bit 28). If set, a floating-point inexact result does not generate a REAL_A-RITHMETIC fault.

Floating-point Normalizing Mode (bit 29). If set, denormalized numbers in reals, long reals or extended reals are first normalized before arithmetic is performed. If clear, denormalized numbers generate a REAL_ARITHMETIC fault.

Floating-point Rounding Control (bits 31-30). This field indicates which rounding mode is in effect for floating point computation:
  00—round to nearest (even)
  01—round down (toward negative infinity)
  10—round up (toward positive infinity)
  11—truncate (round toward zero)

Stack Frame

The stack frame is a contiguous portion of current linear address space, containing data in a stack-like fashion. The stack grows from low addresses to high addresses. There is one stack frame per activated procedure, which contains local variables, parameters, and linkage information. A call operation acquires a new stack frame; a return operation releases it. When a new frame is acquired, it is aligned on a SALIGN*16 byte boundary, where SALIGN is a pre-defined value.

The page or simple object into which the first 64 bytes of a frame are mapped must be of local lifetime. The lifetime of the page or simple object is checked during a call. This restriction is necessary to ensure efficient manipulation of ADs in the local registers.

In addition to the requirement that a frame is mapped onto a local page or local simple object, the mixed bit of the page or the object descriptor is set even though no tag bit may be written to the frame. This restriction is necessary to ensure efficient manipulation of ADs in the local registers.

The fields in the stack frame are defined as follows:

Padding Area. This area is used to align the FP to the next SALIGN*16 byte boundary. The size of this area varies from 0 to SALIGN * 16−1 bytes. When a call operation is performed, a padding area is added to round the caller's SP to the next boundary to form the FP for this frame. If the caller's SP is already aligned, the padding area is absent.

Frame Status (L0). The frame status records the information associated with the frame, after a call, to be used on a return from the frame. The fields of a frame status are defined as follows:

Return Status, RRR (bits 0-2). This 3-bit field records the call mechanism used in the creation of this frame and is used to select the the return mechanism to be used on return. The encodings of this field are as follows:
  000 Local
  001 Fault
  010 Supervisor, trace was disabled before call
  011 Supervisor, trace was enabled before call
  100 Subsystem (intrasubsystem)
  101 Subsystem (intersubsystem)
  110 Idle interrupt
  111 Interrupt Prereturn Trace, P (bit 3). On a return from a frame when the prereturn trace bit is 1, a prereturn trace event (if enabled) occurs before any actions association with the return operation is performed. This bit is initialized to zero on a call if no call-trace event occurred; otherwise it is initialized to 1.

Previous Frame Pointer, PFP (bit 4-31). A linear address to the first byte of the previous frame. Since frames are aligned to boundaries of 16 bytes or more, only the most-significant 28 bits of the FP are saved.

During a call, the RRR field is initialized as follows:
  000—local call, or supervisor call from supervisor mode
  001—fault call
  0IT—supervisor call from user mode
  100—intrasubsystem call
  101—intersubsystem call
  110—interrupt call from idle state
  111—interrupt call from executing state T is the value of the trace-enable flag from the process controls.

On all returns, the PRRR bits are interpreted as follows:
  1xxx Generate a prereturn trace
  0000 Perform a local return
  0001 Perform a fault return.
  001T In supervisor mode, perform a supervisor return. The T bit is assigned to the trace enable bit in the process controls, and the execution mode bit is set to user. Otherwise, perform a local return.
  010x Perform a subsystem return.
  0110 Perform an idle interrupt return.
  0111 Perform an interrupt return.

Stack Pointer, SP (L1). A linear address to the first free byte of the stack, that is, the address of the last byte in the stack plus one. SP is initialized by the call operation to point to FP plus 64.

Return Instruction Pointer, RIP (L2). When a call operation is performed to a new frame, the return IP is saved here. When the process is suspended, the instruction pointer of the next instruction is stored here. It contains a 32-bit linear address to which control is returned after a return to this frame. The content of the RIP of the current frame is undefined. The implication is that a procedure call saves the IP in a register of the current frame. Since implicit procedure calls can occur (due to faults and interrupts), programs should not use this register for other purposes.

Linear Address Space Structure

Figure 2:
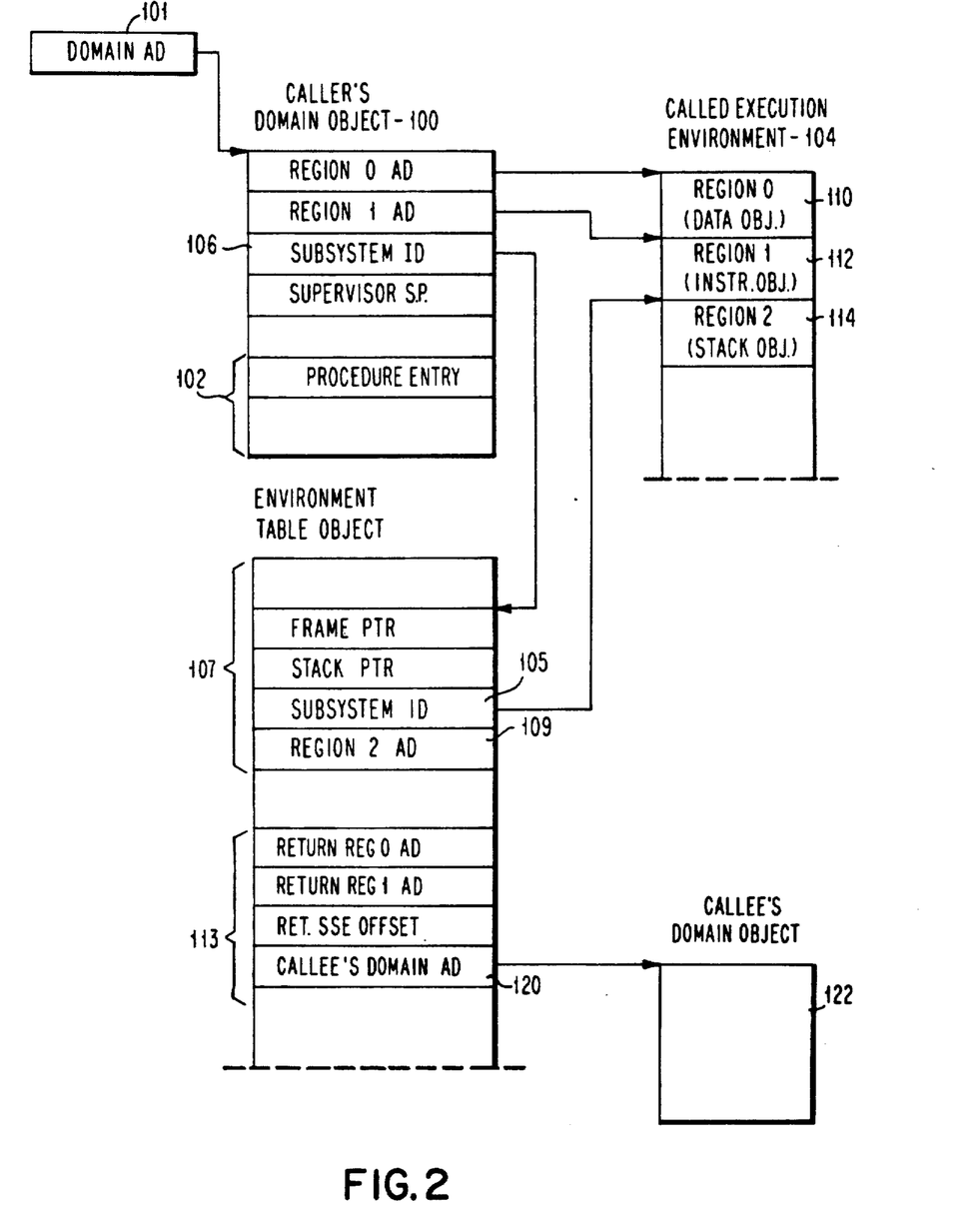
FIG. 2 is a more detailed block diagram of the processor registers portion of the translation lookaside buffer (TLB) of FIG. 1 and of system objects for supporting synchronous communication between execution environments in the main memory shown in FIG. 1.

Each execution environment defines a 32-bit linear address space. The linear address space is partitioned into four regions (regions 0-3) as shown in FIG. 2. The first three regions of an execution environment are specific to the current process (i.e., defined by the process control block). The composition of the process specific regions can be changed by a subsystem call/return. The fourth region of an execution environment is shared by all processes (i.e., defined by the processor control block). The system does not place any restriction on where instructions, stack frames, or data are located in the linear address space.

The physical address mapping of linear addresses from 16#e000_0000# to 16#efff_ffff#, or region 3 offsets from 16#2000_0000# to 16#2fff_ffff# are reserved by the system. These locations may be mapped into physical addresses independent of the object addressing mechanism described in U.S. Pat. No. 5,075,842 for the region 3 object.

A static linear address space with transparent region boundaries can be achieved by page table sharing if all regions are bipaged.

The ADs to the four regions are always interpreted to have read-write rep rights. It is not possible to protect each region differently using AD rep rights. Page level protection can be used to achieve finer grain protection. Also, the implementation is not required to check the tag bits on region ADs (meaning that it has the option of requiring ADs or interpreting data as region ADs).

The size of each region can be changed independently. A gap is formed at the end of a region if the object that is used to define a region is less than 1G bytes.

A simple object can be used to define a region if the object's size is either 512, 1K, 2K or 4K bytes. The base address of a simple region object must be aligned to physical address boundaries which are multiples of its size. When a simple object is used to define a region, the length and the base address of the simple object are assumed to satisfy the above restrictions.

When a process is executing, all four regions must be unique (in the sense that each must have a different occurrence of a region descriptor).

If the fault handler for virtual-memory faults is not a subsystem fault handler, the following occur. For any process in the executing, ready, or blocked state, the descriptors of its regions must be marked as valid (i.e., the V flags must be set).

Instruction Protection

For the processor to execute instructions, read rights are needed for locations which contain the instructions.

Instruction Caching

The system allows read-only caching of any bytes in the instruction stream in a non-transparent fashion. Instruction caching is independent of the cacheable bit in the page where instructions are located. Self-modified programs are not supported by the system in a transparent fashion.

Local Procedure Mechanism

A procedure begins at any arbitrary word address in a linear address space. Procedure calls and return use a stack in the linear address space, as shown in FIG. 2.

Two parameter passing mechanisms are possible:

Global Registers. Parameters are copied to the global registers by the caller and copied out (if necessary) of the global registers by the callee after the call. Return or result parameters are copied to the global registers by the callee and copied out of the global registers by the caller after a return. This is optimized for procedures with a small number of parameters.

Argument List. An argument pointer to an argument list on the stack is used. This is designed as an escape mechanism when there are more parameters than can be passed using global registers.

The global register approach is always faster than the argument pointer approach. Hence, the argument pointer approach should only be used as an escape mechanism, and not the only mechanism.

When a procedure never invokes another procedure, it can avoid copying its parameters from the global registers to the stack frame.

Instructions
Local Call
 CALL
 CALL_EXTENDED

CALL and CALL_EXTENDED invoke the procedure at the address specified. CALL specifies the procedure as IP plus a 24-bit signed displacement. CALL_EXTENDED specifies the procedure using a general memory effective address.

A new stack frame is allocated during the call operation and the control flow is transferred to the specified procedure.

Return Instruction return

The RETURN instruction transfers control back to the calling procedure and releases the called procedure's stack frame. Instruction execution is continued at the instruction pointed to by the return instruction pointer (RIP) in the calling procedure's frame.

Miscellaneous Instructions

MODIFY_AC
FLUSH_LOCAL_REGISTERS
CONVERT_ADDRESS

MODIFY_AC is used to read or modify the current arithmetic controls. FLUSH_LOCAL_REGISTERS writes all local register sets except for the current one into their associated frames in memory. Because the region ADs are not directly accessible, the CONVERT_ADDRESS instruction can be used to convert a linear address into a virtual address.

The invention may be embodied in a microprocessor such as that described in U.S. Pat. No. 5,075,842. The microprocessor is logically subdivided into five major units: the Instruction Fetch Unit, the Instruction Decoder and Microinstruction Sequencer, the Translation Lookaside Buffer, the Local Bus Sequencer, and the Integer Execution Unit and Floating Point Unit.

Inter-Environment Transfer

Refer to FIG. 2. Inter-environment call/returns provide synchronous communication between execution environments. In addition to a two-state protection mechanism (user state and supervisor state), the system also supports an object oriented, subsystem based protection mechanism.

In accordance with the present invention, procedure invocation across environment boundaries is provided in order for a process to gain access to those data structures and procedures that are otherwise private to an environment. A domain object is used to represent the "public" interface of an environment. A domain object is also used as the interface to both a domain-based and a supervisor call mechanism. A domain object includes a procedure table which contains the addresses and types (subsystem or supervisor) of all public procedures.

The term "subsystem transfer" (call/return) is used to describe the subsystem protection mechanism. The term "supervisor transfer" is used to describe the supervisor protection mechanism.

Execution Modes

The two modes of execution can occur, User mode and Supervisor mode, so that conventional operating systems can be emulated. The system does not define the notion of privileged instructions. All instructions can be executed in either User mode or Supervisor mode. A program gains privilege by nature of its access rights and the mode it is executing in. Access rights are referred to as representation rights (rep rights), such as read only, read/write or no access. The page rep rights in the current linear address space are interpreted differently depending on the execution mode. Storage used by the operating system generally has page rep rights which do not allow user access, but may be read-only or read/write in the Supervisor mode.

In systems where tagging is disabled (As described in the above referenced U.S. Pat. No. 5,075,842, the tag bit is not available to distinguish between data and pointers to data called access descriptors (ADs). Since all operands have tag bits of zero, any attempt to execute instructions or operand specifiers which require an AD will fault in User mode. In the supervisor mode, the fault is disabled and the data is treated as an AD. Supervisor mode allows the execution of instructions which use ADs as operands (e.g. the SEND instruction requires an AD to a port object).

In systems where tagging is enabled, the only difference between the user and supervisor modes is the page rep rights interpretation. The automatic interpretation of data as ADs in supervisor mode is not supported. Instructions which require ADs can be executed if the specified operand is an AD.

In an untagged system, the call system instruction is the only way to change the execution mode to supervisor without causing a fault. The system domain contains a set of entry procedures for the operating system.

Supervisor Procedure Mechanism

The supervisor procedure call is similar to a local call. When a supervisor procedure is specified in the procedure table in a domain object, the domain object specifies the new supervisor stack pointer. If the process is in user mode, the supervisor stack pointer is used as the new frame pointer. If the process is already in supervisor mode, the stack pointer in the current frame is aligned to the next 64-byte boundary to form the new frame pointer. This allows calling supervisor procedures from a supervisor procedure. The supervisor stack is required to be frozen. This is an intra-execution environment transfer with the exception that the execution mode (and trace enable) of the process can be changed as part of the call.

The return status field is used to signal a supervisor return on a return from the frame. A supervisor return is performed only if the process is in supervisor mode at the beginning of the instruction. Otherwise, a local return is performed. This prevents the modification of the trace control and the selection of either fault or interrupt return by a procedure in user mode.

The supervisor procedure mechanism is for use with a simple untagged operating system, an operating system that requires only two stacks (user stack and supervisor stack) sharing the same linear address space and two protection levels.

Subsystem Based Protection

Refer to FIG. 1 which illustrates a subsystem transfer mechanism. The execution environments use a domain-based protection mechanism. The target execution environment of a subsystem call is defined by the contents of a domain object (100). The procedure table (102) in a domain object is independent of that in another domain for the same execution environment; thus selected procedures in the domain can be collected together in any order using another domain object. This feature will also support procedure variables.

Public information or objects associated with an environment may be accessible to programs that are executing in other environments. These objects are accessible via a domain object, which is used to limit accessibility (by other execution environments) to only the public procedures, public constants and public variables of a package.

Private information or objects associated with an environment are not directly accessible via a domain object from other execution environments. Objects and data not accessible via the domain object are said to be private to the domain. As part of a subsystem call operation, objects that define the execution environment are made accessible inside the execution environment.

The rep rights of the AD (101) referencing a domain object are set to read-only to allow access to public read-only information, indirect access to the object that contains the public variables of the domain, and pointers to the public procedures. Except for the domain object type manager, a domain object AD (101) is not given write rights. If it were otherwise, protection could be bypassed by modifying a domain object. The read-only public information can be duplicated in the domain object to avoid the extra level of indirection if it is located in a separate object. The alterable public variables are located in a separate object to which both the domain and the target execution environment (104) have an AD with read-write rights.

Target Execution Environment

A domain object (100) is used to specify the target environment (104) of a subsystem call. A subsystem transfer may change one or more of the objects that define the current execution environment. With appropriate placement in three regions (data object, Instruction Object and Stack Object) of static data, stack frames, and instructions, a subsystem transfer does not need to change all three regions at the same time. This information is located in the three regions as follows:

Data Object. Region 0 (110) is used for static data and private variables. A subsystem call/return changes at least region 0.

Instruction Object. Region 1 (112) is used for instructions. This allows sharing the instruction part of a domain by copying a single AD without having to use page table sharing. This region may remain unchanged during a subsystem call/return if the execution environments are in the same compilation unit.

Stack Object. Region 2 (114) is used for stack frames. This region is process specific and sharing among processes is not possible. This region may remain unchanged during a subsystem call/return if the execution environments are in the same protected subsystem.

If the fault handler for virtual-memory faults is specified in the fault table as a subsystem, the object table entries (OTEs) for the regions of this subsystem must be marked as valid. Failing to do so will lead to a system error or to an incorrect frame or stack pointer when the fault handler is invoked.

Subsystem ID and Subsystem Table

A domain (100) does not directly specify the region 2 AD of the target environment (104), but indirectly with a subsystem ID (106). The subsystem table (108) locates all the region 2 stack objects and their corresponding topmost frame and stack pointers associated with a process. There is a one-to-one correspondence between a subsystem ID and a region 2 AD within a process. A subsystem ID can be mapped to different region 2 ADs each associated with a different process. The subsystem ID is used to select a subsystem entry (107) in the subsystem table (108) in the environment table object (FIG. 7) associated with the current process. A subsystem entry (FIG. 8), in turn, specifies the region 2 AD (109) and the topmost stack frame in the region.

The word that contains a subsystem ID can be either an AD or data. If ADs are used to represent subsystem IDs, the object index field of the AD provides a system wide and unique ID for the subsystem. Otherwise, software to assigns unique IDs to each subsystem within a single process. The subsystem ID together with the subsystem table serves the following functions:

Stack object sharing among domains. Domains in the same protected subsystem use the same subsystem ID to allow stack object sharing.

Reentrancy of a stack object. When a subsystem is exited on a call to another subsystem, the linear address of the topmost frame is saved in the subsystem entry. This allows a call from subsystem A to subsystem B which in turn calls subsystem A without returning from subsystem B first.

Trusted subsystems. A zero subsystem ID indicates the current stack object is used for region 2. This allows two mutually suspicious subsystems to share the same trusted library module (e.g., a run-time library).

Guarantee stack resource. Since the stack resource associated with a subsystem need not be shared with other subsystems, it is possible under some situations for software to guarantee that stack resource exhaustion never occurs. This allows certain faults be handled synchronously.

Domain object sharing among processes. The subsystem ID also allows the same domain to be used by different processes, but the same domain is mapped to different region 2 ADs using different process specific stacks.

Control Stack

The subsystem call/return mechanism maintains a control stack (in the environment table object associated with a process) for the subsystem linkage information. A control stack is an array of control stack entries which saves the state of the execution environment to be restored on a return.

Extended Subsystem Environment

When the subsystem model is used, the execution environment is extended to include the following:

Environment Table Object. This includes both the subsystem table and the control stack.

Current Subsystem ID. The process is associated with a subsystem ID which is saved in the process object together with related information like current subsystem table offset for the current subsystem entry.

When the subsystem model is not used, the fields in the extended environment are not used and need not be present.

Interrupt/Idle Environment

When the process is in the interrupted state, or when the processor is in idle state, an interrupt environment table object is used in subsystem calls. The interrupt environment table contains an extra system defined entry for the default interrupt subsystem ID.

Domain Objects

Figure 5:
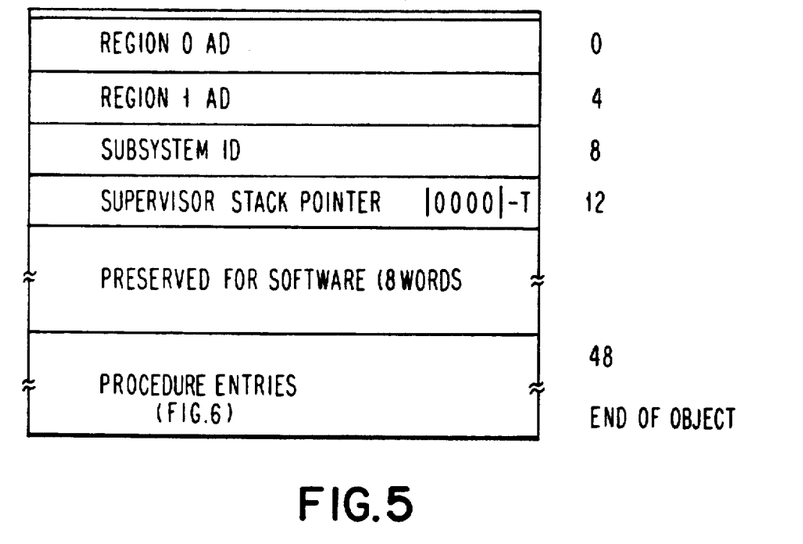
FIG. 5 is a more detailed block diagram of a domain object of FIG. 2.

Refer to FIG. 5 which illustrates a domain object. A domain object has an architecture-defined system type. The type rights in a domain object AD are uninterpreted. The fields of a domain object are defined as follows:

Region 0 AD (bytes 0-3). This AD references the object which defines region 0 of the target execution environment for a subsystem call. If the tag bit is zero, raise a CONSTRAINT.INVALID_AD fault.

Region 1 AD (bytes 4-7). This AD references the object which defines region 1 of the target execution environment for a subsystem call. If the tag bit is zero, raise a CONSTRAINT.INVALID_AD fault.

Subsystem ID (bytes 8-11). This mixed value is the subsystem ID used to select an entry in the subsystem table in the environment table associated within the process object. A subsystem entry in the subsystem table specifies the object that defines region 2 of the target execution environment and the frame pointer of the topmost stack frame in the environment. If this field is a data word of zero, the current region 2 is used and the current frame is the topmost stack frame. Bits 6-31 of the subsystem ID is used to generate a hash value into the subsystem table.

Trace Control, T (byte 12, bit 0). This bit specifies the trace enable bit of the process after a subsystem or supervisor call via this object. This bit can be used to disable or enable tracing inside a the new execution environment. This bit is ignored when calling a supervisor procedure in supervisor mode. This bit has the same encoding as that in the process controls.

Supervisor Stack Pointer (bytes 12—15, bits 2—31). This is a linear address (in words) for the supervisor stack. This field is used when invoking a supervisor call in the user mode (instead of the stack pointer in the current frame) to locate the new frame.

The process only distinguishes between a user stack (in user mode) and a supervisor stack (in supervisor mode). If the supervisor stack pointers in different domains contain different values, all the stacks must be big enough to handle all supervisor procedures, needs. Hence, the supervisor stack pointers used by a process should be the same. Since the fault table is associated with a processor, all the processes sharing the same processor need to have a supervisor stack as specified by the supervisor fault handling procedures. Hence, the supervisor stack pointer should be a system wide constant.

Figure 6:
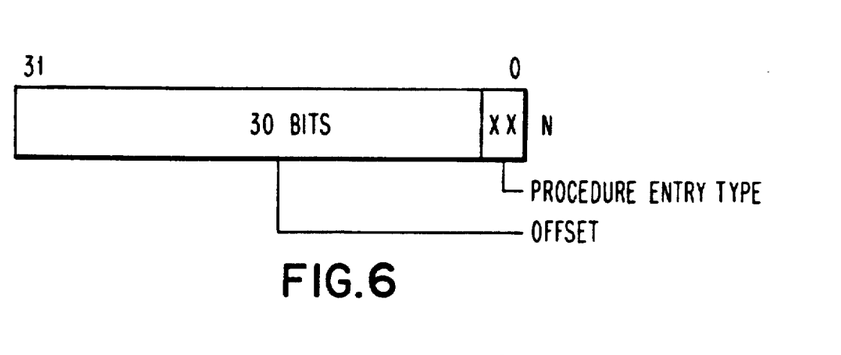
FIG. 6 is a more detailed block diagram of a procedure entry in the domain object of FIG. 4.

Procedure Entries (from byte 48 to the end of the object). A procedure entry, shown in FIG. 6, specifies the type and address of the target procedure. The fields of a procedure entry are defined as follows:

Procedure Entry Type (bits 0-1). This field indicates the type of procedure to be invoked. The encodings of this field are as follow:

00—local procedure
01—Implementation Specific
10—supervisor procedure
11—subsystem procedure Offset (bits 2-31). This 30-bit field is a word offset into the target execution environment to the first instruction of the target procedure.

Environment Table Object

The environment table object, shown in FIG. 2, contains two data structures: a subsystem table (111) and a control stack (113). This object contains information necessary for all subsystem transfer within a single process; thus there is a one-to-one correspondence between a process object and an environment table object.

This shown in more detail in FIG. 5. The environment table object does not have a defined system type. The fields of an environment table object are defined as follows:

Subsystem Table. This area is described in the following section. The first entry is used to store the current control stack pointer, control stack limit, and subsystem table size.

Control Stack. This area is described in the following section.

Subsystem Table

During a subsystem call, a domain object directly specifies only two out of the three objects that define the new execution environment. The domain object contains a subsystem ID (106) which indirectly specifies the third object (114) of the new execution environment. A subsystem table is a data structure within an environment table object which provides the mapping of a subsystem ID (106) to a region 2 AD (109) of the new environment. Region 2 is used for stack frame allocation on call/returns; thus this object cannot be shared among different processes.

Figure 7:
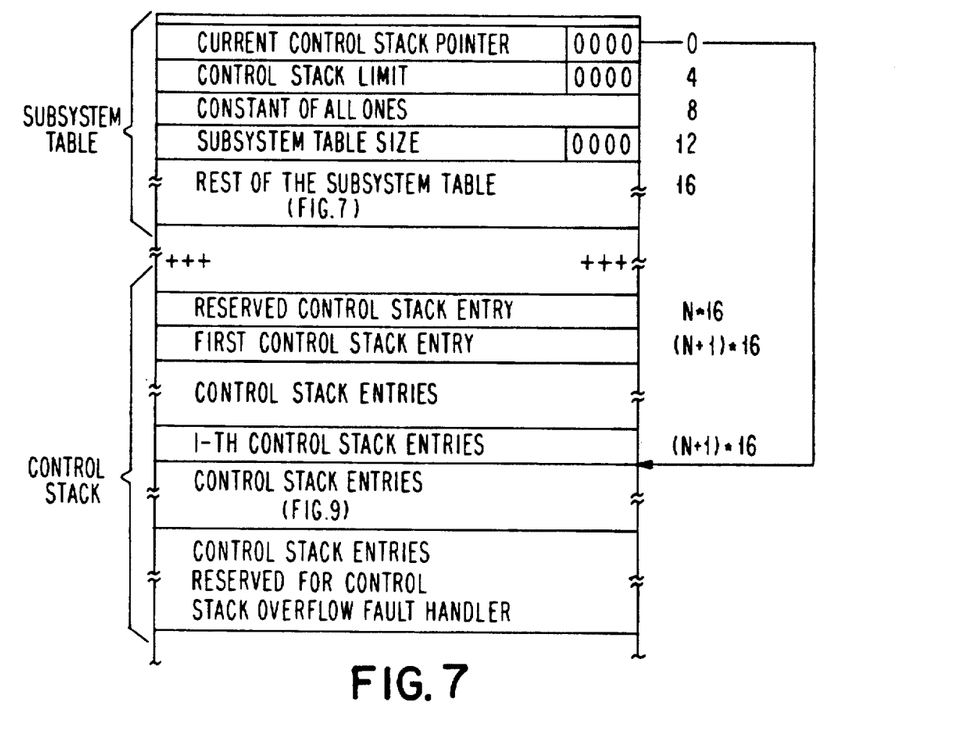
FIG. 7 is a more detailed block diagram of the environment table object of FIG. 2.

The first entry of the subsystem table of FIG. 7 is a dummy entry with the following defined fields:

Current Control Stack Pointer, CCSP (bytes 0-3, bits 4-31). This is an quad-word index for this object to the next available Control Stack Entry (CSE). This field is incremented on a subsystem call and decremented on a subsystem return.

Figure 11:
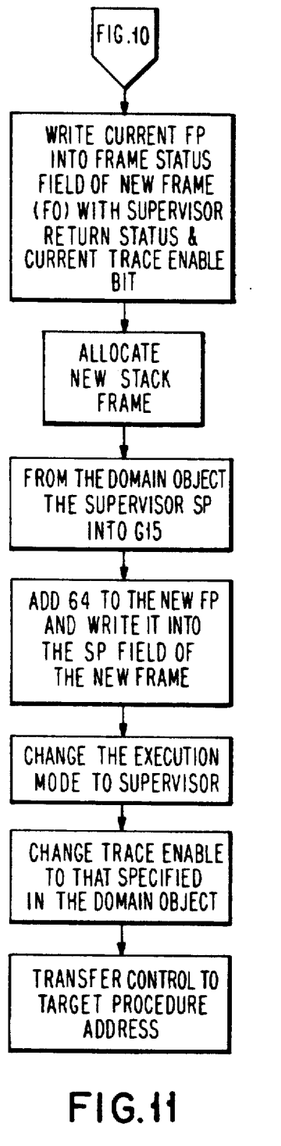

Control Stack Limit, CSL (bytes 4-7, bits 4-31). This is an quad-word index for this object to the first CSE reserved for the control stack overflow fault handler (i.e. not for regular uses). As shown in FIG. 11, When CCSP=CSL after the completion of a subsystem call, a CONTROL_STACK.OVERFLOW fault is generated.

Subsystem Table Size (bytes 12-15, bits 4-29). This field contains the size (in units of subsystem entries) minus one of the subsystem table. This size of a subsystem table must be a power of 2; thus this field contains a bit mask of ones in the least significant bits. Otherwise, the behavior is unpredictable.

Subsystem ID to Subsystem Entry Mapping

As shown in FIG. 11, subsystem ID selects the corresponding subsystem entry in the subsystem table as follows:

If the specified subsystem ID is zero or equal to the current subsystem ID, the current subsystem ID is used. Otherwise, search the subsystem table as specified below.

Bits 6-31 of the specified subsystem ID is logically-ANDed with the subsystem table size to form the initial subsystem entry index.

Repeat the following:

(1) If the subsystem ID in the selected subsystem entry is zero, a OPERATION.SUBSYSTEM_NOT_FOUND fault may be raised.

(2) If the subsystem ID in the selected subsystem entry matches (compare_mixed) that of the specified subsystem ID, exit from the search.

(3) Select the previous subsystem entry, i.e. search backward. Entry 0 wraps around to the last entry pointed to by the system table size.

(4) If this is the initial subsystem entry and the process is not in interrupted state, raise a OPERATION.SUBSYSTEM_NOT_FOUND fault. If the process is in interrupted state, the current subsystem is used.

Subsystem Entry

Figure 8:
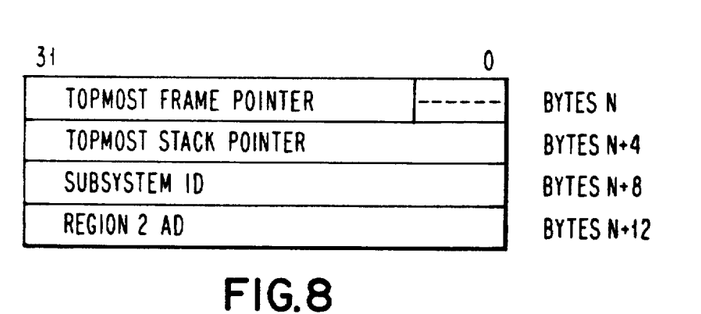
FIG. 8 is a more detailed block diagram of a subsystem entry of the environment table object of FIG. 7.

The structure of a subsystem entry is shown in FIG. 8. The fields of a subsystem entry are defined as follows:

Topmost Frame Pointer (bytes 0-3, bits 6-31). This field contains the frame pointer of the topmost stack frame. During a subsystem call into this environment, this field is used as the previous frame pointer in the new frame. During a subsystem call from this environment, the current frame pointer is saved here. During a subsystem return to this environment, this is used as the target frame pointer. During a subsystem return from this environment, the previous frame pointer in the current frame is saved here.

Topmost Stack Pointer (bytes 4-7). This field contains the stack pointer in the topmost stack frame. During a subsystem call into this environment, this field is used to compute the frame pointer of the new frame. During a subsystem call from this environment, the current stack pointer is saved here. During an inter-subsystem return from this environment, the current frame pointer (i.e. the rounded stack pointer in the previous frame) is saved here. During other inter-subsystem return from this environment, the current frame pointer minus 64 (i.e. the rounded stack pointer in the previous frame) is saved here. During an return to this environment, this field is ignored.

Subsystem ID (bytes 8-11). This ID (105) identifies the subsystem the target execution environment is associated with. This ID is used as the key for matching the subsystem ID (106) to the region 2 object (114); thus it is unique within the subsystem table. A subsystem ID value of zero indicates this subsystem entry is unallocated. Subsystem table entry 0, with a subsystem ID of all ones, is used for storing control stack information.

Event-Fault Disable (byte 8, bit 2). When this subsystem is entered, this flag defines the current value of the event-fault disable bit. If the event-fault disable bit is set, no event.notice fault will be signalled. If the event-fault disable bit is clear, an event.notice fault is raised if the event-fault request flags are set. On an inter-subsystem call/return which changes the event-fault flag to 0, a pending event-fault request be raised after the call/return.

Region 2 AD (bytes 12-15). This AD (109) references the object which defines the region 2 of the target execution environment partially specified by this entry. This AD must contain read/write rights, a protection.ad_rep_rights faults may be raised otherwise.

Control Stack

Figure 9:
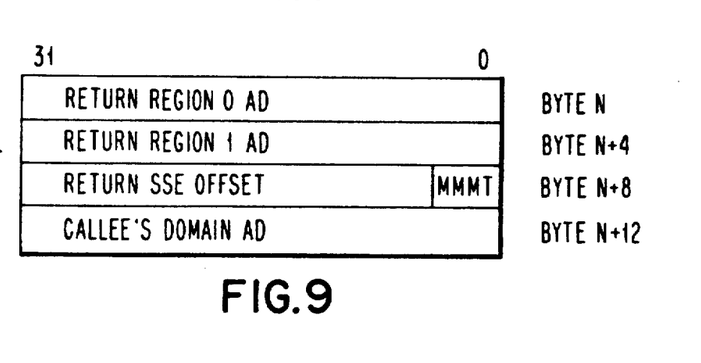
FIG. 9 is a more detailed block diagram of the control stack entry of the environment table object of FIG. 7.

The organization of the control stack (113) is shown in FIG. 7. A control stack entry (FIG. 9) is pushed on the control stack on a subsystem call, and popped off the control stack on a subsystem return. The control stack is delimited on the low end by a reserved control stack entry. The control stack is delimited on the high end by the control stack limit plus a few reserved entries (for the control stack overflow fault handler). The number of entries to be reserved for stack overflow fault handler is software defined.

When the corresponding process is being executed, parts or all of the control stack are held internally in the processor (i.e., the memory image may not be accurate, and reading/writing the memory image does not necessarily have any effect on the control stack). The load_ control_stack_pointer instruction can be used to flush and invalidate any cached information.

Control Stack Entry

The format of a control stack entry is shown in FIG. 8. The fields of a control stack entry are defined as follows:

Return Region 0 AD (bytes 0-3). This AD references the object which defines the region 0 of the calling execution environment of the corresponding subsystem call. On a subsystem return, region 0 is restored to this object. This AD must contain read/write rights, a protection. ad_rep_rights fault may be raised otherwise.

Return Region 1 AD (bytes 4-7). This AD references the object which defines the region 1 of the calling execution environment of the corresponding subsystem call. On a subsystem return, region 1 is restored to this object. This AD must contain read/write rights, a protection. ad_rep_rights fault may be raised otherwise.

Trace Control, T (byte 8, bit 0). This bit contains the trace enable bit in the process controls during the corresponding normal subsystem calls. During a subsystem return, the trace control is restored to this bit.

Return Mode, MMM (byte 8, bits 1-3). This 3-bit field indicates the type of entries. This field is encoded as follows:

000—Normal intra-subsystem
001—Normal inter-subsystem
010—reserved (CONTROL_STACK.UNDERFLOW fault)
011—reserved (CONTROL_STACK.UNDERFLOW fault)
100—Fault intra-subsystem
101—Fault inter-subsystem
110—reserved (CONTROL_STACK.UNDERFLOW fault)
111—reserved (CONTROL_STACK.UNDERFLOW fault)

Return Subsystem Entry Offset (bytes 8-11, bits 4-31). This field contains the entry index into the subsystem table (in the environment table) for the subsystem entry that defines the region 2 of the calling execution environment.

When a subsystem table is expanded and rehashed, the subsystem entry offset changes and needs to be updated.

Callee's Domain AD (bytes 12-15). This AD (120) references the domain object used in this subsystem call. This is initialized during a call, but it is not used on a return.

Inter-Domain CALL/RETURN

CALL_DOMAIN Instruction

The CALL_DOMAIN instruction invokes the procedure specified by the procedure number in the specified domain object, and changes the execution environment as specified by the domain object. The specified domain AD must have read rights. The procedure number is used as a word index into the procedure table in the specified domain object for a procedure entry.

CALL_SYSTEM Instruction

The CALL_SYSTEM instruction calls a procedure in the system domain. The system domain is a domain referenced by the processor control block. It is necessary to allow supervisor calls in an untagged system. In a tagged system, the system domain is used to map supervisor calls of an untagged operating system to a tagged operating system.

Figure 3:
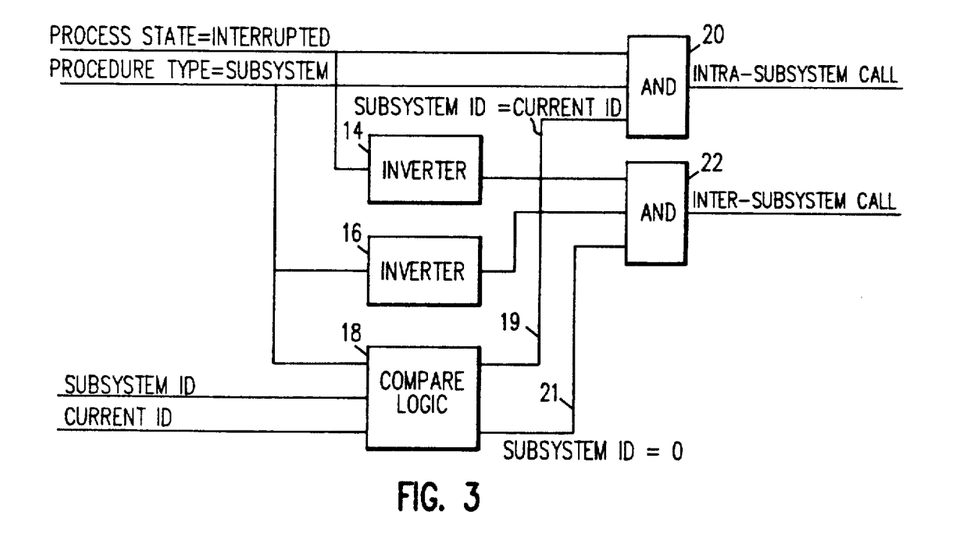
FIG. 3 is a more detailed block diagram of the protection logic of FIG. 1.
Figure 4:
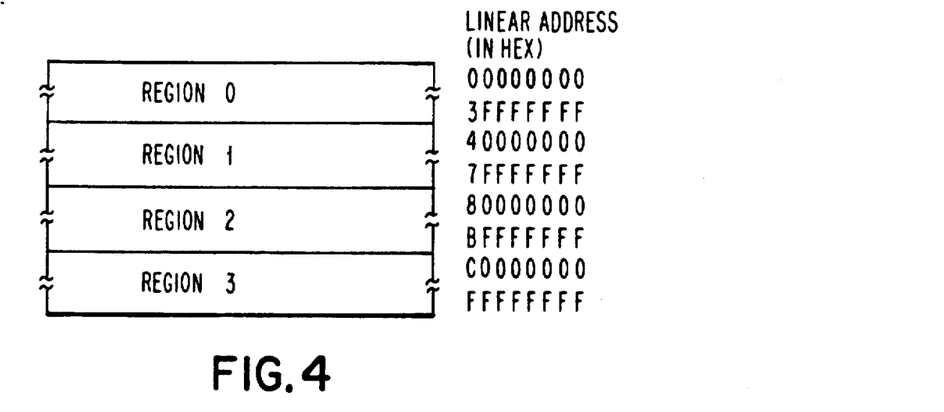
FIG. 4 is a more detailed block diagram of the linear addresses space structure of the execution environment of FIG. 2.
Figure 10:
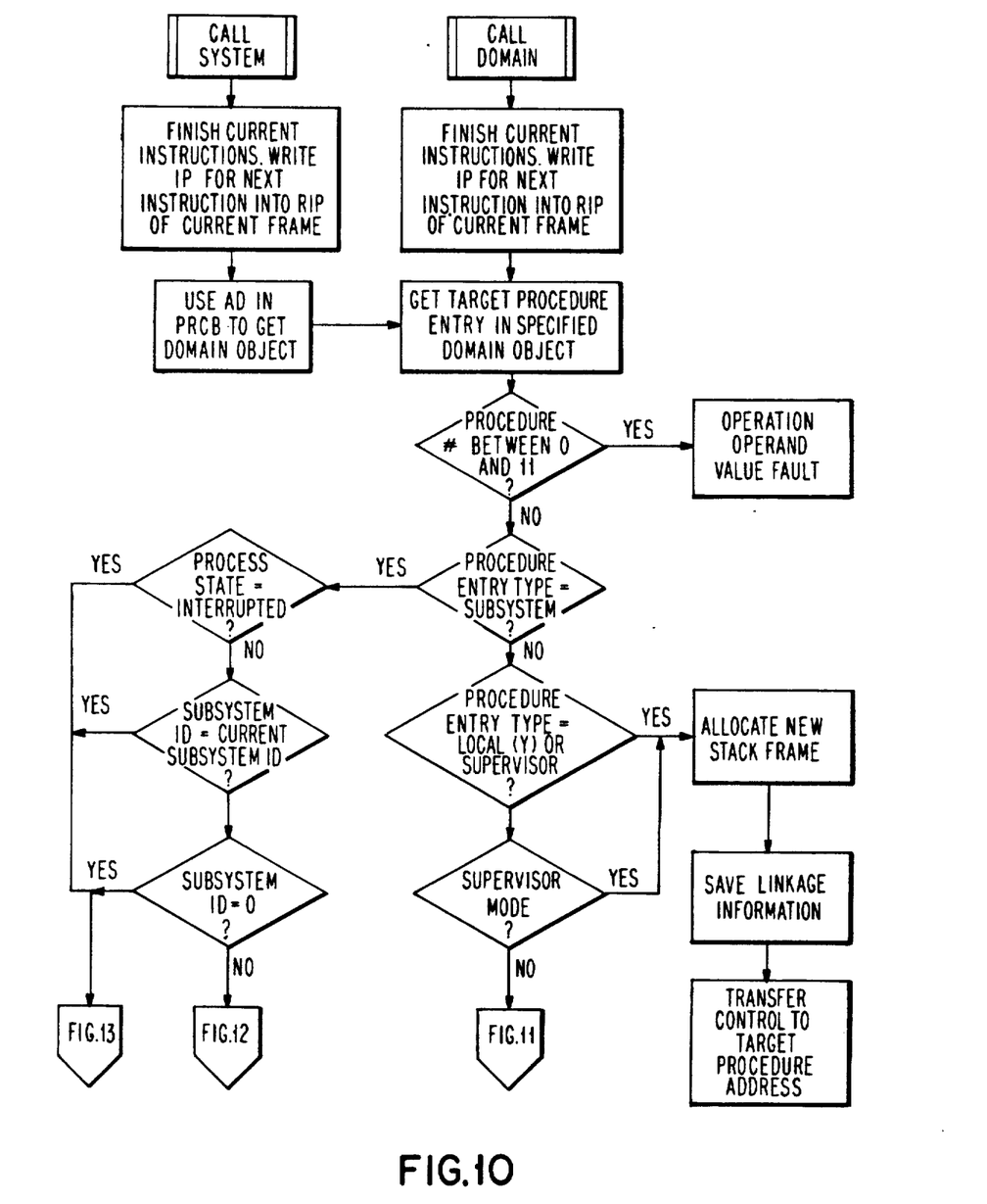
FIGS. 10 and 11 comprise a flow chart of the call system instruction.
Figure 12:
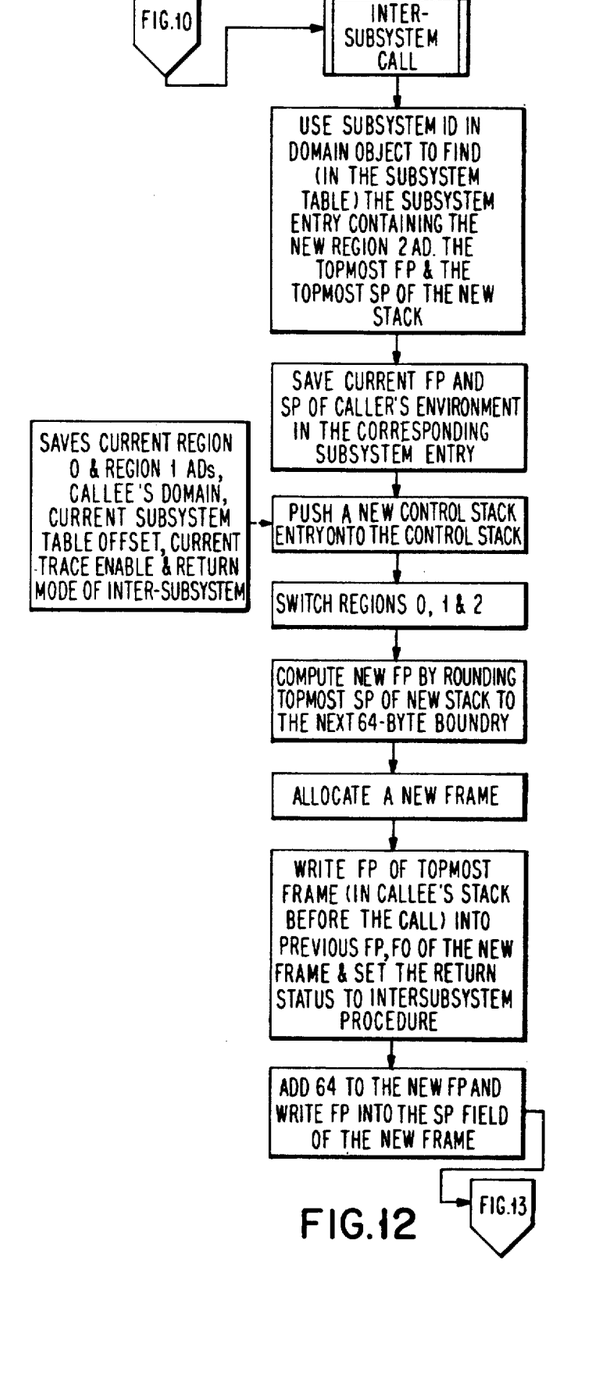
FIG. 12 flow chart of the inter-subsystem call subroutine of the call system instruction of FIGS. 10 and 11.
Figure 13:
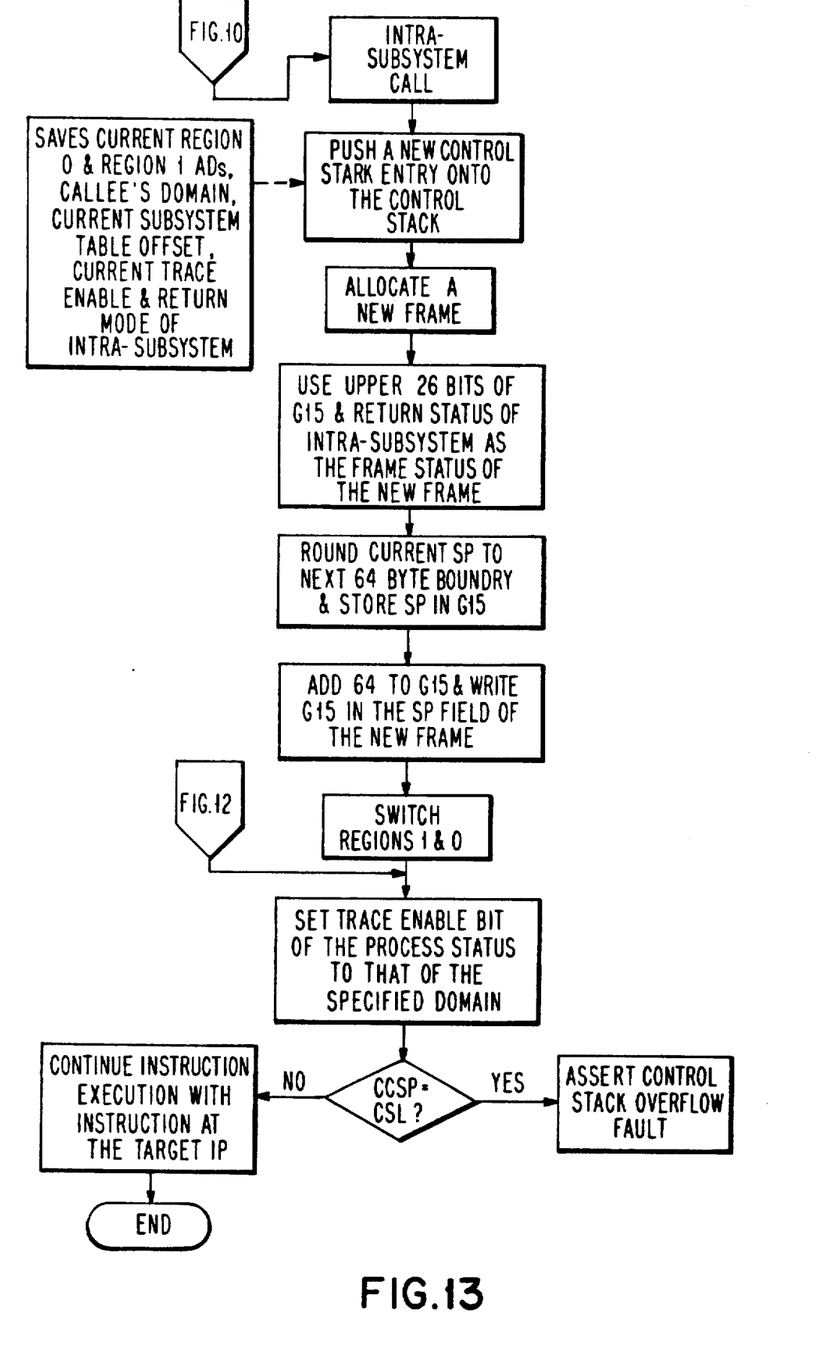
FIG. 13 flow chart of the intra-subsystem call subroutine of the call system instruction of FIGS. 10 and 11.

FIGS. 10 through 13 are a flow chart the CALL_SYSTEM instruction. FIG. 12 details the inter-subsystem call subroutine of the call system instruction and FIG. 13 details the intra-subsystem call subroutine of the call system instruction. Refer now to FIG. 3 which is a more detailed block diagram of the protection logic of FIG. 1. As shown in FIG. 10, the CALL_SYSTEM instruction causes the procedure type entry to be examined. If the process state is interrupted and the procedure type is subsystem, then the output of AND (20) is asserted, provided the subsystem ID is equal to the current ID resulting in the output (19) of compare (18) being asserted. This results in the selection of a intra-subsystem call shown in FIG. 13.

If the process state is not interrupted and the procedure type is not subsystem, then the output of AND (20) is not asserted. However, the output of AND (22) is asserted, provided the subsystem ID is equal to the zero, resulting in the output (21) of compare (18) being asserted. This results in the selection of an intersubsystem call shown in FIG. 12.

RETURN instruction

The particular return action is determined by the return status field in the previous frame field of the current frame. This allows procedures to be invoked from both inside or outside of their associated domains, even though different actions are taken.

LOAD_CONTROL_STACK_POINTER Instruction

The LOAD_CONTROL_STACK_POINTER returns the current control stack pointer of the process.

While the invention has been particularly shown and described with reference to preferred embodiments thereof, it will be understood by those skilled in the art that the foregoing and other changes in form and detail may be made therein without departing from the scope of the invention.

We claim:

1. In a data processing system including
   a memory space and a processor register space in a processor of said data processing system, said processor register space including means for storing object descriptors having base and length information stored therein for use in locating objects in said memory space,
   means in said processor for communicating with said memory space; and,
   means in said processor for executing an operation by means of an operator specified in an instruction;
   the improvement comprising in combination:
   first means in said processor for communicating between a current (calling) execution environment stored in said memory space and a target (called) execution environment stored in said memory space,
   second means in said processor, connected to said first means, for storing first objects defining said current (calling) execution environment,
   said current execution environment being accessible by means of a first domain object,
   third means in said processor, connected to said first means, for storing in said memory second objects defining said target (called) execution environment, said target execution environment being accessible by means of a second domain object;

fourth means in said processor for creating a first environment table object, said first environment table object being accessible by means of said first domain object;

said environment table object including a control stack for containing subsystem linkage information, said control stack being an array of control stack entries, which entries represent a state of said current (calling) execution environment to be restored on a return from said target (called) execution environment which is a target of a subsystem call;

fifth means in said processor for storing in said second domain object a Region 0 access descriptor (AD) that reference a Region 0 object which defines region 0 of said target (called) execution environment which is a target of a subsystem call;

sixth means in said processor for storing in said second domain object a Region 1 AD that references a Region 1 object which defines region 1 of said target (called) execution environment which is the target of a subsystem call;

seventh means in said processor for storing in said second domain object a subsystem ID that points to an entry in a subsystem table in said first environment table object, a subsystem entry in said subsystem table specifying a Region 2 object that defines region 2 of said target (called) execution environment and a frame pointer of a topmost stack frame in said target (called) execution environment, a supervisor Stack Pointer that is a linear address (in words) for a supervisor stack used when invoking a supervisor call in a user mode (instead of the stack pointer in the current frame) to locate a new frame;

eighth means in said processor for storing, in said second domain object, Procedure Entries that specify a type and an address of said target (called) environment, each of said procedure entries including a Procedure Entry Type field that indicates a type of procedure to be invoked including, but not limited to, a supervisor procedure and a subsystem procedure, and an Offset into said target (called) execution environment, which offset specifies a first instruction of said target (called) execution environment; and, ninth means in said processor, connected to said fourth means and to said seventh means, for utilizing said subsystem ID in said second domain object to find, in said subsystem table in said first environment table object, a subsystem entry containing a new region 2 access descriptor, and a top most frame pointer and a topmost stack pointer of a new stack.

2. The data processing system in accordance with claim 1 wherein:

said Environment Table Object contains two data structures, a subsystem table and a control stack; and, said subsystem table is comprised of entries for locating said region 2 object and said topmost stack frame and said supervisor stack pointer.

3. The data processing system in accordance with claim 1 further comprising:

tenth means for saving a Current Subsystem ID in said first process object together with said current subsystem table offset for a current subsystem entry in said subsystem table in said first environment table object.

4. The data processing system in accordance with claim 1 further comprising:

eleventh means for saving a linear address of the topmost frame in the subsystem entry upon the condition that a subsystem is exited on a call to another subsystem.

5. The data processing system in accordance with claim 1 wherein said region 0 is a Data Object that contains static data and private variables;

said region 1 is an instruction object that contains instructions, and, said region 2 is a stack object that contains stack frames accessible by means of a specific process.

* * * * *